United States Patent
Salonidis et al.

(10) Patent No.: US 9,210,055 B2
(45) Date of Patent: Dec. 8, 2015

(54) DEVICE AND METHOD FOR COMPUTATION OF CHANNEL LOSS RATE AND COLLISION LOSS RATE OF COMMUNICATION LINK(S) IN A RANDOM ACCESS NETWORK

(71) Applicant: THOMSON LICENSING, Issy de Moulineaux (FR)

(72) Inventors: Theodoros Salonidis, Cambridge, MA (US); Georgios Sotiropoulos, Athens (GR); Roch Guerin, Clayton, MO (US); Ramesh Govindan, Los Angeles, CA (US)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/474,410

(22) Filed: Sep. 2, 2014

(65) Prior Publication Data

US 2014/0369227 A1 Dec. 18, 2014

Related U.S. Application Data

(63) Continuation of application No. 13/138,924, filed as application No. PCT/EP2010/053640 on Mar. 19, 2010, now Pat. No. 8,824,318.

(30) Foreign Application Priority Data

Apr. 28, 2009 (EP) ..................................... 09305366

(51) Int. Cl.
*H04L 12/26* (2006.01)
*H04B 17/30* (2015.01)
(Continued)

(52) U.S. Cl.
CPC ................ *H04L 43/04* (2013.01); *H04B 17/30* (2015.01); *H04B 17/309* (2015.01); *H04L 1/203* (2013.01);
(Continued)

(58) Field of Classification Search
CPC ......... H04L 47/10; H04L 45/26; H04L 47/27; H04L 47/32; H04L 47/25; H04L 47/263; H04L 1/0036; H04L 1/0045; H04W 40/10; H04W 40/12; H04W 40/246
See application file for complete search history.

(56) References Cited

U.S. PATENT DOCUMENTS

| 4,935,809 A | 6/1990 | Hayashi et al. |
| 6,105,064 A * | 8/2000 | Davis et al. ................... 709/224 |

(Continued)

FOREIGN PATENT DOCUMENTS

| CN | 1491522 | 4/2004 |
| CN | 101176311 | 5/2008 |

(Continued)

OTHER PUBLICATIONS

Cheng et al: "Jigsaw: Solving the puzzle of enterprise 802.11 analysis", ACM SIGCOMM, 2006, Sep. 11-15, 2006; pp. 1-12.

(Continued)

*Primary Examiner* — Raj Jain
(74) *Attorney, Agent, or Firm* — Myers Wolin LLC

(57) ABSTRACT

A method is intended for computing online channel loss rate and collision loss rate of at least one communication link established between nodes (N1, N2) of a network (WN) using a random access MAC protocol. This method comprises the steps of i) dividing time in probing windows and transmitting a chosen number S of probe packets during each probing window from a transmitter node (N1) to a receiver node (N2) linked therebetween, ii) measuring a packet loss rate from probe packets lost on this communication link during a probing window, iii) scanning each probing window with smaller sliding windows, each having a size Wk smaller than S, to identify the sliding window during which only channel losses occur, and then for computing a channel loss rate on this communication link from this identified sliding window, and iv) computing a collision loss rate on this communication link by subtracting the computed channel loss rate from the measured packet loss rate.

19 Claims, 1 Drawing Sheet

(51) Int. Cl.
*H04B 17/309* (2015.01)
*H04L 1/20* (2006.01)
*H04W 74/08* (2009.01)
*H04W 40/12* (2009.01)
*H04L 1/00* (2006.01)

(52) U.S. Cl.
CPC ....... *H04L 1/0045* (2013.01); *H04L 2001/0092* (2013.01); *H04W 40/12* (2013.01); *H04W 74/0858* (2013.01)

(56) References Cited

U.S. PATENT DOCUMENTS

| | | | |
|---|---|---|---|
| 7,916,746 | B2 | 3/2011 | Yonge, III |
| 8,824,318 | B2 * | 9/2014 | Salonidis et al. ............. 370/252 |
| 2002/0167920 | A1 | 11/2002 | Miyazaki |
| 2004/0081132 | A1 | 4/2004 | Tonlatti et al. |
| 2004/0228282 | A1 | 11/2004 | Bao |
| 2005/0128947 | A1 | 6/2005 | Silverman |
| 2005/0229072 | A1 * | 10/2005 | Setton et al. .................. 714/748 |
| 2006/0067242 | A1 | 3/2006 | Bi et al. |
| 2007/0115814 | A1 * | 5/2007 | Gerla et al. ................... 370/230 |
| 2009/0196194 | A1 * | 8/2009 | Paloheimo et al. ........... 370/252 |

FOREIGN PATENT DOCUMENTS

| | | |
|---|---|---|
| EP | 1251708 | 10/2002 |
| EP | 1434388 | 6/2004 |
| JP | 1198188 | 8/1989 |
| JP | 2001244939 | 9/2001 |
| JP | 2002185473 | 6/2002 |
| JP | 2006526364 | 11/2006 |
| JP | 2008512025 | 4/2008 |
| WO | WO2005112325 | 11/2005 |
| WO | WO2006224994 | 3/2006 |
| WO | WO2006120652 | 11/2006 |
| WO | WO2008076945 | 6/2008 |

OTHER PUBLICATIONS

Kashyap et al: "A measurement-based approach to modeling link capacity in 802.11-based wirelessnetworks",Proceedings of Intl Conference, Sep. 9-14, 2007, pp. 1-12.

Kim et al: "CARA: Collision-aware rate adaptation for IEEE 802.11 WLANS", IEEE INFOCOM 2006, pp. 1-11.

Mahajan etal: "Analyzing the MAC-level behavior of wireless in the wild", ACM SIGCOMM, 2006, pp. 1-12.

Padhye at al: "Estimation of Link Interference in Static Multi-hop Wireless Networks", Proceedings of Internet Measurement Conference,Oct. 2005; pp. 1-6.

Qui et al: "A general model ot wireless interference", Proceedings of International Conference on Mobile Computing and Networking, Sep. 9-14, 2007; pp. 1-12.

Reis et al: "Measurement-based models of delivery and interference in static wireless networks", Proceedings of the 2006 conference on Applications SIGCOMM'06, Sep. 11-15, 2006 pp. 1-12.

Rayanchu et al , "Diagnosing Wireless Packet Losses in 802.11: Separating Collision from WeakSignal", INFOCOM 2008, The 27th Conference on Computer Communications, IEEE, Apr. 13, 2008, pp. 1408-1417.

Whitehouse et al: "Exploiting the capture effect for collision detection and recovery",EmNetS-11, May 30-31, 2005; pp. 1-8.

Wong at al: "Robust rate adaptation for 802.11 wireless networks",ACM Mobicom, Sep. 23-26, 2006; pp. 1-12.

Yun et al: "Collision detection based on RF energy duration in IEEE 802.11 wireless LAN", Comsware, 2006, pp. 1-6.

Chatzimisios et al., "Revisit of fading channel characteristics in IEEE 802.11 WLANs: independent and burst transmission errors", 2006 IEEE 17th International Symposium on Personal, Indoor and Mobile Radio Communications, Sep. 1, 2006, pp. 1-6.

Zhou et al., "Cross-layer analysis of IEEE 802.11 DCF in burst-error fading channels with diversity", 2005 International Conference on Wireless Networks, Communications and Mobile Computing, Jun. 13, 2005, pp. 704-709.

Aguayo et al., "Link-Level Measurements from an 802.11b mesh network", SIGCOMM '04 Proceedings of the 2004 conference on Applications, technologies, architectures, and protocols for computer communications, Aug. 30, 2004, Portland, Oregon, USA, pp. 1-11.

Chebrolu et al., "Long-distance 802.11b links: performance measurements and experience", MobiCom '06 Proceedings of the 12th annual international conference on Mobile computing and networking, Sep. 23, 2006, Los Angeles, California, USA, pp. 1-12.

* cited by examiner

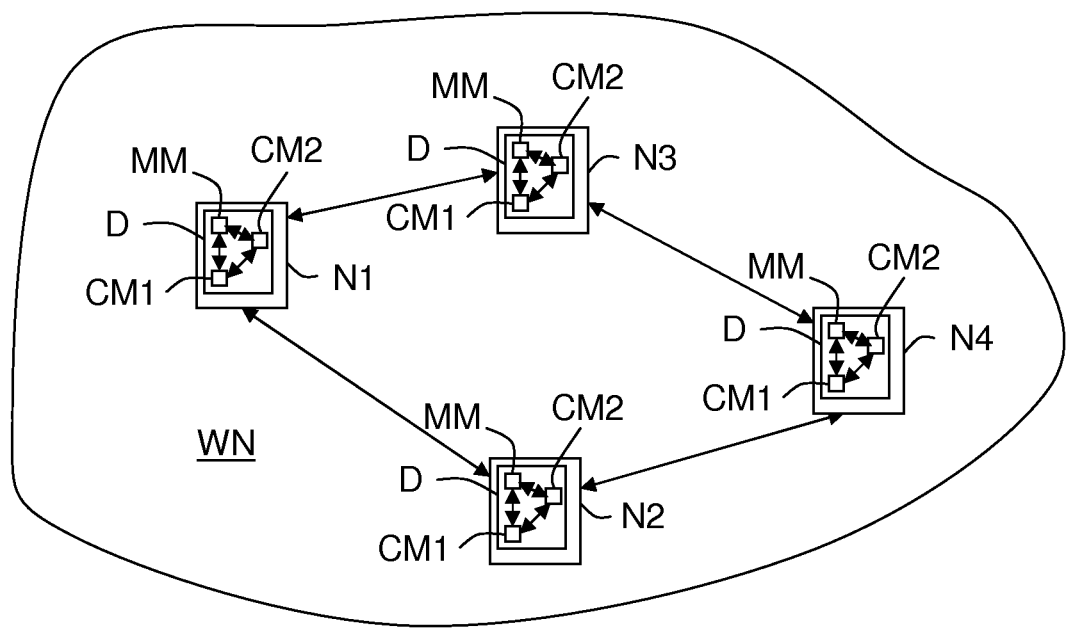

DEVICE AND METHOD FOR COMPUTATION OF CHANNEL LOSS RATE AND COLLISION LOSS RATE OF COMMUNICATION LINK(S) IN A RANDOM ACCESS NETWORK

CROSS-REFERENCE TO RELATED APPLICATIONS

This application is a continuation of co-pending U.S. application Ser. No. 13/138,924 filed Oct. 25, 2011, herein incorporated by reference. This application claims the benefit, under 35 U.S.C. §365 of International Application PCT/EP2010/053640 filed Mar. 19, 2010, which was published in accordance with PCT Article 21(2) on Nov. 4, 2010 in English and which claims benefit of European Patent application 09305366.8 filed Apr. 28, 2009.

TECHNICAL FIELD

The present invention relates to random access networks, and more precisely to packet loss computation during operation in such networks.

One means here by "random access network" a network in which nodes operate based on a random access (or "contention-based") MAC ("Medium Access Control") protocol, such as ALOHA or CSMA ("Carrier Sense Multiple Access"), for instance. So it could be a fixed (communication) network or a wireless (communication) network, and notably an IEEE 802.11 network (i.e. a WLAN (Wireless Local Area Network), for instance of the WiFi type), or an IEEE 802.15.4 network (or ZigBee), or else a satellite network. It is recalled that in ALOHA MAC protocols nodes contend for the medium only using random backoff, while in CSMA MAC protocols nodes in addition use carrier sensing before performing random backoff.

BACKGROUND OF THE INVENTION

As it is known by the man skilled in the art, during operation in a random access network packet losses can be either due to channel errors or due to collisions.

One means here by "collision losses" packet losses that occur when two or more packets arrive simultaneously (or "collide") at a receiver node.

Moreover one means here by "channel error losses" packet losses that do not involve simultaneous packet transmissions and that are due to the (wireless) channel (or link) between a transmitter node and a receiver node. It is recalled that the (wireless) channel behavior depends notably on node locations and/or transmit power and/or received signal strength and/or (wireless) hardware implementation and/or environmental factors.

Packet loss rate during network operation can be measured by means of groups of probe packets transmitted between nodes during pre-specified probing time windows. In this case, the packet loss rate is the fraction of probe packets that have been lost during a pre-specified probing time window. Unfortunately it is much more difficult to separate (or compute) the two components of the measured packet loss rate, i.e. the channel loss rate and the collision loss rate, during the operation of a random access network, whereas it is of interest for the two following reasons.

Firstly, this separation enables efficient joint operation of random access MAC protocols and data rate adaptation mechanisms. It is recalled that random access protocols and data rate adaptation mechanisms aim at addressing different causes of packet loss. Random access MAC protocols aim to address losses due to collisions by carrier sensing and contention window adaptation, while data rate adaptation mechanisms aim to improve channel quality on an individual link by adapting the modulation data rate. Both random access MAC protocols and data rate adaptation mechanisms trade off throughput efficiency for packet loss avoidance, but they both require knowledge of the cause of packet loss for correct operation. Unfortunately, this information is not provided by the physical (PHY) layer specifications of existing (wireless) standards. So, all random access MAC protocols assume that a packet loss is due to collisions and therefore increase the contention window size (in case of CSMA/CA) or the backoff probability (in case of ALOHA), and all data rate adaptation mechanisms assume that a packet loss is due to poor channel quality and therefore decrease the modulation data rate to lower the bit error probability by increasing the transmit power available to each bit. Therefore, unless these mechanisms can correctly ascertain the causes of packet losses, they may take unnecessary or erroneous actions that result in inefficient operation.

Secondly, this separation enables accurate capacity estimation, traffic optimizations and admission control in random access networks. In contrast to networks using scheduled access MAC protocols, such as Time Division Multiple Access (TDMA), it is well known by the man skilled in the art that it is hard to model and optimize networks using random access MAC protocols. Traffic optimizations require measurement of a traffic-independent network state (link capacity) to optimally allocate traffic to available resources. Accurately estimating this traffic-independent network state calls for measuring link capacities in the absence of collisions, as these collisions may only arise once traffic has been allocated in the network. Separation of collision losses (traffic-dependent) and channel error losses (traffic independent) is, therefore, crucial for properly sizing link capacities so as to be able to allocate traffic to optimize the performance of random access networks.

Solutions which have been proposed to separate channel losses from collision losses can be approximately shared in two classes: a two-phase class and a continuous class. In a two-phase class solution the network periodically suspends operation to measure channel loss rates, while in a continuous class solution the network operation is never suspended.

More precisely, a two-phase class solution is based on the division of the time of network operation in two phases: a measurement phase and a normal network operation phase. During the measurement phase, normal network operation is suspended and the nodes must execute a sequential transmission technique to broadcast probe packets sequentially in a scheduled manner. Since only one node transmits at a time, this solution can measure the channel loss rates of all communication links in the network during this probing window, using O(N) measurements, where N is the number of nodes in the network. Then, the collision rate for this probing window is extracted from the measured packet loss rate of the subsequent normal network operation phase.

Unfortunately these two-phases class solutions seem impractical and not applicable to an operational network. Indeed, they impose an extended network downtime just for network measurements. In order to collect sufficient statistics, each node needs to transmit for tens of seconds during the measurement phase, as mentioned in the document of Jitendra Padhye et al., "Estimation of Link Interference in Static Multi-hop Wireless Networks", Proceedings of Internet Measurement Conference, Berkeley, Calif., October 2005, or in the document of Lili Qiu et al., "A general model of wireless interference", Proceedings of International Conference on Mobile Computing and Networking, Montréal, Canada, September 2007, or in the document of Anand Kashyap et al., "A measurement-based approach to modeling link capacity in 802.11-based wireless networks", Proceedings of International Conference on Mobile Computing and Networking, Montréal, Canada, September 2007, or else in the document of Charles Reis et al., "Measurement-based models of delivery and interference in static wireless networks", Proceedings of the 2006 conference on Applications, technologies, architectures, and protocols for computer communications, Pisa, Italy, September 2006. Thus, each measurement phase can result in network downtime of several minutes even for small networks of 20-30 nodes.

Moreover, the implementation of the sequential technique in an operational network requires a signaling protocol to coordinate the nodes so that they could be able to switch between the two phases. This signaling protocol is itself a source of overhead and is difficult to implement in general network environments (multi-hop or distributed, for instance).

The continuous class comprises per-packet solutions that attempt to detect the cause of packet loss for each transmitted packet, and passive monitoring techniques where additional monitoring devices "sniff" received packets and send packet timing information to a centralized point which is in charge of estimating the loss rates using global information.

A first solution of the continuous class is described in the document of S. Rayanchu et al., "Diagnosing Wireless Packet Losses in 802.11: Separating Collision from Weak Signal", IEEE INFOCOM 2006, Barcelona, Spain. This first solution attempts to diagnose the cause of loss on a per-packet basis in 802.11 WLANs, that are single-hop networks consisting of clients connected to an access point (AP). For each packet transmitted by a client and received in error at an access point, the latter acknowledges with a copy of this erroneous packet. Then, the client uses statistical techniques to determine whether the packet was corrupted due to collisions or channel losses. This technique can be used to estimate channel loss rate and collision loss rate by counting the fractions of corrupted packets due to channel errors during a pre-specified time window.

This first solution has several drawbacks. Firstly, it introduces overhead due to the additional acknowledgment packets (and this overhead is increased when communication links are lossy). Secondly, the acknowledgement packets are assumed to be loss-free, but in practice they are subject to both channel losses and collision losses. Thirdly, channel loss rates and collision loss rates can only be estimated for received corrupted packets at the access point, not for packets that were transmitted but not received at this access point. Fourthly, it is specific to the client/access point WLAN environment and exploits a special type of feedback from the access point that provides information on bit errors and symbol errors within a packet.

A second solution of the continuous class is described in the document of K. Whitehouse et al., "Exploiting the capture effect for collision detection and recovery", EmNetS-11, 2005. This second solution attempts to detect two types of collisions in the presence of capture in a sensor network: stronger-first and stronger-last where the packet with the stronger power comes first and last, respectively. In a stronger-first collision the receiver node detects a collision by finding a new extra termination symbol, while in a stronger-last collision the receiver node detects a collision by finding a new preamble during the reception of another packet.

This second solution has several drawbacks. Firstly, it can be only applied to restricted collision scenarios for successful detection (the transmissions which result in a collision should have enough differences in transmission start time and receiving power). Secondly, a stronger-last detection requires modifications on the transmitter node side (a new extra termination symbol). Thirdly, it requires low-level access to communication parameters which is not provided by most existing standards.

A third solution of the continuous class is described in the document of J. Yun et al., "Collision detection based on RF energy duration in IEEE 802.11 wireless LAN", Comsware, 2006, New Delhi, India. It aims at detecting collision in 802.11 WLANs by measuring the RF energy and its changes during such an event. The main assumption is that the RF energy duration of a collision is greater than the RF energy duration of individual transmissions. The access point of a basic service set (BSS) measures RF energy duration on a channel and broadcasts this result to its clients. Then, the clients detect collisions by checking the duration against the duration of their previous transmission schedules.

This third solution has several drawbacks. Firstly, it is specific to WLAN scenarios and requires low-level access and MAC layer modifications which are not provided by the 802.11 standard. Secondly, it may introduce significant overhead to communicate the RF energy information from an access point back to its clients.

A fourth solution of the continuous class is described in the document of S. Wong et al., "Robust rate adaptation for 802.11 wireless networks", ACM Mobicom, 2006, Los Angeles, Calif., and in the document of J. Kim et al., "CARA: Collision-aware rate adaptation for IEEE 802.11 WLANs", IEEE INFOCOM 2006, Barcelona, Spain. This fourth solution is based on the use of RTS/CTS MAC layer control messages that precede data transmissions to detect collisions and perform intelligent data rate adaptation in 802.11 WLANs. Failure of the RTS/CTS packets is attributed to collision because these packets are small and sent at the lowest modulation data rate, and failure of data packet following a successful RTS/CTS is attributed to channel loss. To reduce overhead, the RTS/CTS mechanism is enabled adaptively only when collision is detected.

This fourth solution has several drawbacks. Firstly, it is specific to 802.11 WLANs and data rate adaptation mechanisms. Secondly, accurate computation of collision and channel error rates requires the 802.11 RTS/CTS mechanism to be always enabled. However in practice RTS/CTS is typically not enabled due to the high overhead, especially at the higher modulation data rates. Thirdly, it requires modifications of the 802.11 MAC protocol which are not supported by the 802.11 standard.

A fifth solution of the continuous class is described in the document of Y. Cheng et al., "Jigsaw: solving the puzzle of enterprise 802.11 analysis", ACM SIGCOMM, 2006, Pisa, Italy, and in the document of R. Mahajan et al., "Analyzing the MAC-level behavior of wireless networks in the wild", ACM SIGCOMM, 2006, Pisa, Italy. This fifth solution is based on passive monitoring techniques consisting in computing packet overlaps using monitor nodes and global network knowledge. Monitor nodes are dedicated hardware devices that "sniff" all packets received around the normal nodes and report them to a central server. The central server is in charge of computing all timings based on a global reference and then of determining which packets overlapped in time.

This fifth solution has several drawbacks. Firstly, it introduces an implementation complexity and a communication overhead for communicating all the information to the central server. Secondly, it requires a global up-to-date network knowledge at the central server to perform an accurate estimation. Even with such global knowledge it is not straightforward to infer collision loss or channel loss, because packet overlaps do not always result in collision losses, due to physical capture which is difficult to model in general. Thirdly, the predictive power of a passive monitoring technique heavily depends on how densely the monitor nodes are deployed, because when the density increases the probability that a monitor node is close to any given communication link increases.

SUMMARY OF THE INVENTION

The objective of this invention is to offer a method and an associated device allowing estimation (or computation) of the two components of the measured packet loss rate, i.e. the channel loss rate and the collision loss rate, during the operation of a random access network.

More precisely, the invention provides a method, intended for computing channel loss rate ($p_{ch}$) and collision loss rate ($p_{coll}$) of at least one communication link established between nodes of a network using a random access MAC protocol, and comprising the steps of:
  i) dividing time in probing windows (pw) and transmitting a chosen number S of probe packets during each probing window (pw) from a transmitter node to a receiver node linked therebetween,
  ii) measuring a packet loss rate (p) from probe packets lost on this communication link during a probing window (pw),
  iii) scanning each probing window (pw) with smaller sliding windows ($sw_i^{(Wk)}$), each having a size Wk smaller than S, to identify the sliding window during which only channel losses occur (estimated as the sliding window that yields the minimum packet loss rate), and then computing a channel loss rate ($p_{ch}$) on this communication link from this identified sliding window ($sw_i^{(Wk)}$), and
  iv) computing a collision loss rate ($p_{coll}$) on this communication link by subtracting the channel loss rate ($p_{ch}$) from the measured packet loss rate (p).

S being a number (of probe packets) it also defines the size of a window in terms of number of packets that this window may contain.

The method according to the invention may include additional characteristics considered separately or combined, and notably:
  in step i) the transmitter node may transmit probe packets that are network layer packets;
    in step i) the transmitted probe packets can be implemented either as dedicated control packets or dedicated data that are inserted inside data packets;
  in step i) each probing window (pw) may be a time window;
    in step i) each probe packet to be transmitted during a probing window (pw) may comprise a bit denoting that it is a probe packet;
  in a variant, in step i) each probing window (pw) may be defined by a sequence number comprised into each of its S associated probe packets;
  in step iii) one may scan each probing window (pw) with a step of one probe packet;
  in step iii) one may determine a primary packet loss rate ($p_i^{(Wk)}$) for each sliding window ($sw_i^{(Wk)}$) of a probing window (pw) having a size Wk, by dividing the number ($n_i^{(Wk)}$) of probe packets lost during this sliding window ($sw_i^{(Wk)}$) by the size (or number of probes) Wk of this sliding window ($sw_i^{(Wk)}$), then one may reproduce these determinations for a chosen number of different sizes Wk, comprised between a minimum size $W_{min}$ and S, then one may determine a secondary packet loss rate ($p^{(Wk)}$) for each of these different sizes Wk from the associated determined primary packet loss rates ($p_i^{(Wk)}$), then one may determine a size Wk that provides the best estimate of channel loss rate ($p_{ch}$) amongst the different sizes Wk;
  in step iii) one may compare each determined secondary packet loss rate ($p^{(Wk)}$), associated to a size Wk smaller than or equal to a chosen value, with a variable threshold depending on the measured packet loss rate (p), then if at least one of these compared secondary packet loss rates ($p^{(Wk)}$) is greater than this variable threshold, one may choose S as determined size and then one may assign the value of the measured packet loss rate (p), corresponding to the size S, to the channel loss rate ($p_{ch}$), and if these compared secondary packet loss rates ($p^{(Wk)}$) are smaller than or equal to this variable threshold, one may approximate the sequence of determined secondary packet loss rates ($p^{(Wk)}$) by a logarithmic curve of the form a ln(Wk)+b, then one may determine the point ($P_{lc}$) of this logarithmic curve which has the highest curvature, then one may choose the size Wk which corresponds to this determined point ($P_{lc}$) as determined size, and then one may assign the value of the secondary packet loss rate ($p^{(Wk)}$) which is associated to this determined size Wk to the channel loss rate ($p_{ch}$);
  the chosen value may be equal to S/2;
  the variable threshold may be equal to (1−ε)·p, where ε is a chosen parameter greater than 0 and smaller than 1. For instance, ε may be chosen into the interval [0.005, 0.015];
  each secondary packet loss rate ($p^{(Wk)}$), associated to one of the different sizes Wk, may be the minimum of the primary packet loss rates ($p_i^{(Wk)}$) that have been determined for this size Wk;
  the minimum size $W_{min}$ may correspond to the coarsest estimation of channel loss rate. It may either be provided as a requirement or depend on network properties such as the maximum transmission rate of probe packets.

The invention also provides a device, intended for computing online channel loss rate ($p_{ch}$) and collision loss rate ($p_{coll}$) of at least one communication link established between nodes of a network using a random access MAC protocol, and comprising:
  a measurement means arranged for measuring a packet loss rate (p) from probe packets lost on this communication link during a probing window (pw) during which S probe packets are transmitted on this communication link from a transmitter node to a receiver node,
  a first computation means arranged for scanning each probing window (pw) with smaller sliding windows ($sw_i^{(Wk)}$), each having a size Wk smaller than S, to identify the sliding window during which only channel losses occur (estimated as the sliding window that yields the minimum packet loss rate), and then for computing a channel loss rate ($p_{ch}$) on this communication link from this identified sliding window ($sw_i^{(Wk)}$),
  a second computation means (CM2) arranged for computing a collision loss rate ($p_{coll}$) on this communication link by subtracting the computed channel loss rate ($p_{ch}$) from the measured packet loss rate (p).

This first computation means may be further arranged:
  for determining a primary packet loss rate ($p_i^{(Wk)}$) for each sliding window ($sw_i^{(Wk)}$) of a probing window (pw)

having a size Wk, by dividing the number ($n_i^{(Wk)}$) of probe packets lost during this sliding window ($sw_i^{(Wk)}$) by the size Wk of this sliding window ($sw_i^{(Wk)}$), then for reproducing these determinations for a chosen number of different sizes Wk, comprised between a minimum size $W_{min}$ and S, then for determining a secondary packet loss rate ($p^{(Wk)}$) for each of the different sizes Wk from the associated determined primary packet loss rates ($p_i^{(Wk)}$), then for determining a size Wk that provides the best estimate of channel loss rate ($p_{ch}$) amongst the different sizes Wk.

This first computation means may be still further arranged:

for comparing each determined secondary packet loss rate ($p^{(Wk)}$), associated to a size Wk smaller than or equal to a chosen value, with a variable threshold depending on the measured packet loss rate (p), then if at least one of these compared secondary packet loss rates ($p^{(Wk)}$) is greater than this variable threshold, for choosing S as determined size and then for assigning the value of the measured packet loss rate (p), corresponding to size S, to the channel loss rate ($p_{ch}$), and if these compared secondary packet loss rates ($p^{(Wk)}$) are smaller than or equal to the variable threshold, for approximating the sequence of determined secondary packet loss rates ($p^{(Wk)}$) by a logarithmic curve of the form a ln(Wk)+b, then for determining the point ($P_{lc}$) of this logarithmic curve which has the highest curvature, then for choosing the size Wk which corresponds to this determined point ($P_{lc}$) as determined size, and then for assigning the value of the secondary packet loss rate ($p^{(Wk)}$) which is associated to this determined size Wk to the channel loss rate ($p_{ch}$).

This first computation means may be still further arranged for determining each secondary packet loss rate ($p^{(Wk)}$), associated to one of the different sizes Wk, from the minimum of the primary packet loss rates ($p_i^{(Wk)}$) that have been determined for this size Wk.

The invention also provides a (communication) node, intended for communicating into a network using a random access MAC protocol, and comprising a device such as the one above introduced.

BRIEF DESCRIPTION OF THE FIGURE

Other features and advantages of the invention will become apparent on examining the detailed specifications hereafter and the appended drawing, wherein:

FIG. 1 schematically and functionally illustrates an example of network comprising four communication equipments (or nodes) linked therebetween and each equipped with an example of embodiment of a device according to the invention.

DETAILED DESCRIPTION OF THE PREFERRED EMBODIMENT

The appended drawing may serve not only to complete the invention, but also to contribute to its definition, if need be.

The invention aims at offering a method, and an associated device (D), intended for computing online the two components (channel loss rate and collision loss rate) of a packet loss rate measured on at least one communication link established between two nodes (Nj) of a random access network (WN) (i.e. a network using a random access MAC protocol).

In the following description it will be considered that the network (WN) is of the wireless type, and more precisely that it is an IEEE 802.11 network (for instance a WiFi network).

But the invention is not limited to this type of network. Indeed it concerns any type of network comprising nodes (or network equipments) using a random access MAC protocol. So it may be also a wireline network using a random access MAC protocol like Ethernet.

Moreover, the invention concerns not only networks of the multi-hop type (i.e. comprising routers or access points (APs) connected (or linked) therebetween), but also networks of the single-hop type (i.e. comprising base stations (or any equivalent radio network equipments) serving user (or client) wireless communication equipments). It is recalled that a single-hop type wireless network is a particular case of a multi-hop type wireless network.

In the illustrated example the nodes Nj are either access points of the network WN or mobile phones of users that are connected to the network WN through its access points. More generally a node can be either a network equipment (such as a router or an access point) or a user communication equipment (such as a mobile phone, a personal digital assistant (or PDA), a fixed computer or a laptop).

Moreover, in the illustrated example the node index j varies from 1 to 4, but the number of nodes Nj may be greater or smaller than 4.

As mentioned before, the invention proposes a method intended for computing online the channel loss rate and collision loss rate of at least one communication link established between two nodes Nj and Nj' (with j≠j') of a (random access) network WN.

This method is based on the assumptions that (i) collision losses are independent from channel losses, and therefore packet loss increases due to collisions, (ii) interference and collisions create bursty loss patterns, and (iii) losses occur independently when collisions are not present.

Such a method can be implemented at least partly by at least one device D according to the invention.

As it is schematically illustrated in the unique FIGURE, a device D, according to the invention, may be located into several (and preferably each) node Nj of the network WN. But this device D could be also a network equipment or element coupled to a node Nj, or a network equipment connected to the network WN, such as a management equipment.

So, a device D can be made of software modules, at least partly, or of electronic circuit(s) or hardware modules, or else of a combination of hardware and software modules (in this case the device D comprises also a software interface allowing interworking between the hardware and software modules).

When devices D are distributed into the nodes Nj, each of them makes computation for its node Nj. When there is only one device D for the whole network or for a part of a network, this centralized device D makes computations for all the nodes Nj or for the nodes Nj belonging to its network part.

The method according to the invention comprises four main steps.

The first main step (i) of the method consists in dividing time in probing windows pw and in transmitting a chosen number S of probe packets during each probing window pw from a transmitter node Nj (for instance N1) to a receiver node Nj' (for instance N2) which are linked therebetween.

It is important to note that when two nodes Nj are linked therebetween and both equipped with a device D they both transmit each other the same number S of probe packets during probing windows pw of the same size. S is a tunable parameter known to both transmitter node and receiver node of each pair of linked nodes.

For instance in an IEEE 802.11g wireless mesh network, the number S of probe packets transmitted during each probing windows pw may range from 200 to 1280, and the duration of each probing windows pw may range from 2 minutes to 15 minutes.

This first main step (i) can be implemented by each node Nj possibly under control of its associated device D.

The probing window pw can be implemented either as a time window, or by using sequence numbers in the probe packets.

The probe packets are preferably network layer packets. The transmitted probe packets can be implemented either as dedicated control packets or dedicated data that are inserted inside data packets that the nodes Nj of a pair exchange therebetween. Moreover, in the MAC layer the probe packets can be mapped either to broadcast or unicast transmissions.

The information carried in (and/or defining) probe packets depends on the implementation of the probing window pw. If the probing window pw is implemented as a time window, then each probe packet comprises at least one bit denoting that it is a probe packet. If the probing window pw is defined by a sequence number, then each probe packet transmitted during a probing window pw comprises one or more bits defining the sequence number of its probing window pw, and also possibly one bit denoting that it is a probe packet.

The second main step (ii) of the method consists in measuring the packet loss rate p from the probe packets that are lost on a considered communication link during a probing window pw.

The packet loss rate p measured during a probing window pw is equal to the ratio between the number of probe packets that have been effectively (and correctly) received by a receiver node Nj' during this probing window pw and the number S of probe packets sent during this probing window pw by the transmitter node Nj.

This second main step (ii) can be implemented by a measurement means (or module) MM of a device D, from information relative to the received probe packets provided by its associated receiver node Nj'.

The third main step (iii) of the method consists in scanning each probing window pw with smaller sliding windows $sw_i^{(Wk)}$, each having a size Wk which is smaller than S (i.e. the size of the probing window pw), in order to identify the sliding window during which only channel losses occur (i.e. estimated as the sliding window that yields the minimum packet loss rate). Then one computes a channel loss rate $p_{ch}$ on this communication link from this identified sliding window $sw_i^{(Wk)}$.

The sliding window index i varies from 1 to M, where M (number of sliding windows $sw_i^{(Wk)}$ contained into a probing window pw) depends on the size Wk of these sliding windows $sw_i^{(Wk)}$.

This third main step (iii) can be implemented by a first computation means (or module) CM1 of a device D, which is coupled to its measurement means MM.

For instance, one (CM1) may scan each probing window pw with a step of one probe packet. This provides S−Wk+1 starting positions, each starting position corresponding to the start of a sliding window $sw_i^{(Wk)}$ within the probing window pw.

The sliding window identification can be carried out as follows.

For instance, one (CM1) may start by determining a primary packet loss rate $p_i^{(Wk)}$ for each sliding window $sw_i^{(Wk)}$ of a probing window pw having a size Wk. This can be done by dividing the number $n_i^{(Wk)}$ of probe packets that have been lost during this sliding window $sw_i^{(Wk)}$, due to channel errors, by the size Wk of this sliding window $sw_i^{(Wk)}$ (i.e. $p_i^{(Wk)} = n_i^{(Wk)}/Wk$).

Then one (CM1) reproduces the determination of primary packet loss rates $p_i^{(Wk)}$ for a chosen number N of different sizes Wk. These different sizes are comprised between a minimum size $W_{min}$ and S. In other words, one (CM1) determines N groups of primary packet loss rates $p_i^{(Wk)}$ for N different sizes Wk.

For instance, the minimum size $W_{min}$ corresponds to the coarsest estimation of channel loss rate supported by the network WN. For instance, a minimum size $W_{min}$ equal to 10 (i.e. equal to 10 samples) corresponds to 11 loss rates, ranging from zero to 1.0, with a step of 0.1.

Then one (CM1) may determine a secondary packet loss rate $p^{(Wk)}$ for each of the N different sizes Wk from the associated group of primary packet loss rates $p_i^{(Wk)}$.

For instance, each secondary packet loss rate $p^{(Wk)}$, associated to one of the N different sizes Wk, is estimated as the minimum of the primary packet loss rates $p_i^{(Wk)}$ that have been determined for its associated size Wk:

$$p^{(Wk)} = \min(p_1^{(Wk)}, p_2^{Wk}, \ldots, p_{S-Wk+1}^{Wk})$$
$$= \frac{1}{Wk}\min(n_1^{(Wk)}, n_2^{Wk}, \ldots, n_{S-Wk+1}^{Wk}),$$

with $$Wk \in [W_{min}, \ldots, S].$$

Once N secondary packet loss rates $p^{(Wk)}$ have been estimated for the N different sizes Wk, respectively, one (CM1) may determine the size Wk which provides the best estimate of channel loss rate $p_{ch}$ amongst these N different sizes Wk.

This size determination aims at identifying sliding window(s) $sw_i^{(Wk)}$ during which only channel losses occur. Indeed, one can show that there are periods without collisions that are long enough to be used to measure only the channel loss rate $p_{ch}$. So, once such periods have been identified, one has to determine the size Wk which is large enough to give a good estimate of $p_{ch}$, but not so large that one would finally end-up into a period of collision losses.

If one decides to choose the largest size S as determined size Wk, it will provide only one sample which is the measured packet loss rate p that includes both collision and channel losses. Hence, such a choice of determined size Wk cannot discriminate between the two types of losses and therefore over-estimate the channel losses.

Now, if one decides to choose a very small size as determined size Wk, one may capture very few losses (the "min" operator in the preceding equation giving $p_i^{(Wk)}$ will yield 0 if losses are rare enough), and therefore this will under-estimate the channel error rate $p_{ch}$. For small sizes Wk, the estimate of secondary packet loss rate $p^{(Wk)}$ is smaller than p because some windows see too few losses (because they are not long enough to accurately "average out" the channel losses). Then $p^{(Wk)}$ increases with the size Wk until it reaches the measured packet loss for Wk=S ($p^{(Wk=s)}$=p).

So based on these observations, one proposes hereafter an example of size determination (or filter) which offers good results.

For instance, one (CM1) may first select each estimated (or determined) secondary packet loss rate $p^{(Wk)}$ which is associated to a size Wk smaller than or equal to a chosen value. For instance, this chosen value may be equal to S/2.

Then one (CM1) may compare each of these selected secondary packet loss rate $p^{(Wk)}$ with a variable threshold. The latter may depend on the measured packet loss rate p (obtained during the second main step (ii)), for instance. Such a variable threshold may be equal to $(1-\epsilon) \cdot p$, where a is a chosen parameter which is greater than 0 and smaller than 1 ($\epsilon \in ]0, 1[$), for instance. More preferably e may be chosen into the interval [0.005, 0.015]. For instance it may be equal to 0.01 (or 1%).

If at least one of the compared secondary packet loss rates $p^{(Wk)}$ is greater than the variable threshold, this means that $p^{(Wk)}$ increases steeply and reaches p fast, which is a strong indication that the channel loss rate $p_{ch}$ is close to the measured packet loss rate p. So, one (CM1) may choose S as determined size, and therefore one (CM1) may assign the value of the measured packet loss rate p (which corresponds to this size S) to the channel loss rate $p_{ch}$.

Now, if all the compared secondary packet loss rates ($p^{(Wk)}$) are smaller than or equal to the variable threshold, one (CM1) may approximate the sequence of determined secondary packet loss rates ($p^{(Wk)}$) by a logarithmic curve of the form a ln(Wk)+b, for instance. Then one (CM1) may determine the point $P_{lc}$ of this logarithmic curve which has the highest curvature and then the size Wk* which corresponds to this determined point $P_{lc}$.

So, one (CM1) may choose the size Wk* (which corresponds to the determined point $P_{lc}$) as determined size, and one (CM1) may assign the value of the secondary packet loss rate $p^{(Wk*)}$ (which is associated to this determined size Wk*) to the channel loss rate $p_{ch}$ (i.e. $p_{ch}=p^{(Wk*)}$). The point of highest curvature is a well-defined point where the function $p^{(Wk*)}$ increases steeply and reaches p fast, which is a strong indication that the channel loss rate $p_{ch}$ is close to the measured packet loss rate p.

The fourth main step (iv) of the method consists in computing the collision loss rate $p_{coll}$ on the considered communication link by subtracting the computed (or estimated) channel loss rate $p_{ch}$ from the measured packet loss rate p (i.e. $p_{coll}=p-p_{ch}$).

This fourth main step (iv) can be implemented by a second computation means (or module) CM2 of a device D, which is coupled to its measurement means MM and to the first computation means (or module) CM1.

The invention does not only apply to a single communication link, as described above. Indeed it may also applied simultaneously to several (even all the) communication links of a random access network, where the endpoint nodes of each communication link (or there associated devices D) execute the transmitter actions (sending probe packets) and the receiver actions (computing the channel loss rate and collision loss rate) as described above. Furthermore, in a wireless network the invention can be implemented with broadcast probes. In this case, it will require O(N) measurements to compute the channel loss rates and collision loss rates for all communication links in this wireless network.

The invention being based on statistical properties of packet reception timings at the network layer, it offers several advantages, amongst which:
- it does not require suspension of network operation for collection of measurements,
- it is independent of the network technology, and therefore can operate over any random access network (it can be applied to multi-hop and single-hop networks),
- it requires no low-level information or MAC layer modifications to existing network standards,
- the overhead it causes is relatively small and can be controlled by adjusting the parameter S of the probing window. Typically, probing is performed at the network layer by sending probe packets every few seconds,
- it can be applied to numerous applications, and notably to capacity estimation, traffic/topology optimizations, admission control and efficient design of data rate adaptation mechanisms in random access networks.

The invention is not limited to the embodiments of method, device and node (or communication equipment) described above, only as examples, but it encompasses all alternative embodiments which may be considered by one skilled in the art within the scope of the claims hereafter.

The invention claimed is:

1. A device for computing online channel loss rate of at least one communication link established between nodes of a network using a random access MAC protocol, the device comprising:
   a measurement means arranged for measuring a packet loss rate from probe packets lost on said communication link during a probing window during which S probe packets are transmitted on said communication link from a transmitter node to a receiver node,
   a first computation means arranged for scanning each probing window with smaller sliding windows, each having a size Wk smaller than S, to identify the sliding window during which only channel losses occur, and then for computing a channel loss rate on this communication link from this identified sliding window, and
   a second computation means arranged for computing a collision loss rate on said communication link by subtracting said computed channel loss rate from said measured packet loss rate.

2. The device according to claim 1, wherein said first computation means is further arranged:
   i) for determining a primary packet loss rate for each sliding window of a probing window having a size Wk by dividing the number of probe packets lost during said sliding window by said size Wk of said sliding window,
   ii) for reproducing these determinations for a chosen number of different sizes Wk, comprised between a minimum size $W_{min}$ and S,
   iii) for determining a secondary packet loss rate for each of said different sizes Wk from the associated determined primary packet loss rates, and
   iv) for determining a size Wk that provides the best estimate of channel loss rate amongst said different sizes Wk.

3. The device according to claim 2, wherein said first computation means is further arranged:
   i) for comparing each determined secondary packet loss rate, associated to a size Wk smaller than or equal to a chosen value, with a variable threshold depending on said measured packet loss rate, then
   ii) if at least one of said compared secondary packet loss rates is greater than said variable threshold, for choosing S as determined size and then for assigning the value of measured packet loss rate, corresponding to said size S, to said channel loss rate, and if said compared secondary packet loss rates are smaller than or equal to said variable threshold, for approximating the sequence of determined secondary packet loss rates by a logarithmic curve of the form aln(Wk)+b, then for determining the point of said logarithmic curve which has the highest curvature, then for choosing the size Wk which corresponds to said determined point as determined size, and then for assigning the value of the secondary packet loss rate which is associated to said determined size Wk to said channel loss rate.

4. The device according to claim 2, wherein said first computation means is further arranged for determining each secondary packet loss rate, associated to one of said different sizes Wk, from the minimum of the primary packet loss rates that have been determined for said size Wk.

5. A device for computing online channel loss rate of at least one communication link established between nodes of a network using a random access MAC protocol, said device comprising:
- a measurement circuit configured to measure a packet loss rate from probe packets lost on said communication link during a probing window during which S probe packets are transmitted on said communication link from a transmitter node to a receiver node,
- a first computation circuit configured to scan each probing window with smaller sliding windows, each having a size Wk smaller than S, to identify the sliding window during which only channel losses occur, and for computing a channel loss rate on this communication link from this identified sliding window, and
- a second computation circuit configured to compute a collision loss rate on said communication link by subtracting said computed channel loss rate from said measured packet loss rate.

6. The device according to claim 5, wherein the probe packets are network layer packets.

7. The device according to claim 5, wherein the probe packets are implemented either as dedicated control packets or dedicated data that are inserted inside data packets.

8. The device according to claim 5, wherein each probing window is a time window.

9. The device according to claim 5, wherein each probe packet comprises a bit denoting that it is a probe packet.

10. The device according to claim 5, wherein each probing window is defined by a sequence number comprised into each of its S associated probe packets.

11. The device according to claim 5, wherein the first computation circuit is configured to scan each probing window with a step of one probe packet using smaller sliding windows.

12. The device according to claim 5, wherein said first computation circuit is further configured to:
- determine a primary packet loss rate for each sliding window of a probing window having a size Wk by dividing the number of probe packets lost during said sliding window by said size Wk of said sliding window,
- to reproduce these determinations for a chosen number of different sizes Wk, comprised between a minimum size $W_{min}$ and S,
- to determine a secondary packet loss rate for each of said different sizes Wk from the associated determined primary packet loss rates, and
- to determine a size Wk that provides the best estimate of channel loss rate amongst said different sizes Wk.

13. The device according to claim 12, wherein said first computation circuit is further configured to:
- compare each determined secondary packet loss rate, associated with a size Wk smaller than or equal to a chosen value, with a variable threshold depending on said measured packet loss rate, and
- if at least one of said compared secondary packet loss rates is greater than said variable threshold, to choose S as determined size and then to assign the value of measured packet loss rate, corresponding to said size S, to said channel loss rate, and if said compared secondary packet loss rates are smaller than or equal to said variable threshold, to approximate the sequence of determined secondary packet loss rates by a logarithmic curve of the form aln(Wk)+b, then to determine the point of said logarithmic curve which has the highest curvature, then to choose the size Wk which corresponds to said determined point as determined size, and then to assign the value of the secondary packet loss rate which is associated with said determined size Wk to said channel loss rate.

14. The device according to claim 13, wherein said chosen value is equal to S/2.

15. The device according to claim 13, wherein said variable threshold is equal to $(1-\epsilon).p$, where $\epsilon$ is a chosen parameter greater than 0 and smaller than 1.

16. The device according to claim 15, wherein $\epsilon$ is chosen into the interval [0.005, 0.015].

17. The device according to claim 12, wherein said first computation circuit is further configured to determine each secondary packet loss rate, associated with one of said different sizes Wk, from the minimum of the primary packet loss rates that have been determined for said size Wk.

18. The device according to claim 12, wherein said minimum size $W_{min}$ corresponds to a coarsest estimation of channel loss rate supported by said network.

19. A node intended for communicating into a network using a random access MAC protocol, said node comprising:
- a device for computing online channel loss rate of at least one communication link established between nodes of a network using a random access MAC protocol, said device comprising:
- a measurement circuit configured to measure a packet loss rate from probe packets lost on said communication link during a probing window during which S probe packets are transmitted on said communication link from a transmitter node to a receiver node,
- a hardware processor configured to scan each probing window with smaller sliding windows, each having a size Wk smaller than S, to identify the sliding window during which only channel losses occur, and for computing a channel loss rate on this communication link from this identified sliding window, and
- a computation circuit configured to compute a collision loss rate on said communication link by subtracting said computed channel loss rate from said measured packet loss rate.

* * * * *